United States Patent [19]

Shields

[11] Patent Number: 4,551,299
[45] Date of Patent: Nov. 5, 1985

[54] MULTIPLE FUEL ROD GRIPPER

[75] Inventor: Edward P. Shields, North Huntingdon, Pa.

[73] Assignee: Westinghouse Electric Corp., Pittsburgh, Pa.

[21] Appl. No.: 418,141

[22] Filed: Sep. 15, 1982

[51] Int. Cl.$^4$ ............................................. G21C 19/00
[52] U.S. Cl. ..................... 376/261; 376/268; 294/906
[58] Field of Search .............. 376/261, 264, 268, 269, 376/271; 294/86 A, 100, 102 R; 29/723, 400 N, 426.5, 280, 278, 252, 253

[56] References Cited

U.S. PATENT DOCUMENTS

| | | | |
|---|---|---|---|
| 2,638,373 | 5/1953 | Alford | 294/102 R X |
| 3,068,035 | 12/1962 | Foglia | 294/102 R |
| 3,125,760 | 3/1964 | Foster et al. | |
| 3,629,069 | 12/1971 | Wright | |
| 3,733,250 | 5/1973 | Van Santen et al. | 376/269 X |
| 3,768,668 | 10/1973 | Schukei | 376/262 |
| 3,857,599 | 12/1974 | Jones et al. | 294/86 A X |
| 3,904,048 | 9/1975 | Von Santen et al. | 376/271 |
| 4,053,356 | 10/1977 | Brammer, Jr. | |
| 4,064,000 | 12/1977 | Andrea | |
| 4,086,132 | 4/1978 | Meuschke et al. | |
| 4,134,789 | 1/1979 | Aubert | |
| 4,147,588 | 4/1979 | Artemieu et al. | 376/271 |
| 4,272,321 | 6/1981 | Bentancourt et al. | |
| 4,374,801 | 2/1983 | Albin | 376/264 |

Primary Examiner—Deborah L. Kyle
Assistant Examiner—Dan Wasil
Attorney, Agent, or Firm—L. A. DePaul

[57] ABSTRACT

The multiple fuel rod gripper comprises a plurality of split tube collets arranged to be inserted into corresponding tapered holes in a locking plate. When the gripper has been positioned to have a plurality of fuel rods disposed in the holes of locking plate, an actuating mechanism causes the collets to be inserted into the tapered holes thereby causing the fuel rods to be inserted in the collets. The taper of the holes forces the collets into locking engagement with the fuel rods so that the fuel rods may be extracted from the fuel assembly.

11 Claims, 4 Drawing Figures

MULTIPLE FUEL ROD GRIPPER

BACKGROUND OF THE INVENTION

This invention relates to apparatus for removing fuel rods from nuclear fuel assemblies and more particularly to apparatus for simultaneously removing a plurality of fuel rods from a nuclear fuel assembly.

After a period of operation of a nuclear reactor, the fuel assemblies comprising the core of the nuclear reactor must be rearranged with the depleted or spent fuel assemblies being replaced with fresh ones. The spent fuel assemblies are removed from the reactor vessel and generally stored in a pool of water on the reactor site. Since a conventional fuel assembly comprises structure other than fuel rods such as grids and control rod guide tubes, a spent fuel assembly occupies more space in the storage pool than would be required for the individual fuel rods. Because the storage pool has a finite volume it would be desirable to be able to store the fuel rods in a closely packed array and with a minimum of support structure to thereby maximize the amount of spent nuclear fuel that can be stored in a given volume of the storage pool. This would provide a greater storage capacity for the spent fuel rods until the fuel rods are transported off the reactor site for storage or reprocessing.

One way of rearranging the spent fuel in order to maximize the volume of spent fuel stored involves removing the spent fuel rods from the fuel assembly and storing the spent fuel rods in a closely packed array. However, since the spent fuel rods have been irradiated during reactor operation, they are highly radioactive and can be handled only by remote manipulators and while the fuel rods are submerged in a coolant. The radioactive nature of the spent fuel assemblies increases the difficulty of not only transporting the spent fuel assembly but of also dismantling the fuel assembly and storing the spent fuel rods.

Therefore, what is needed is apparatus for efficiently removing the spent fuel rods from a spent fuel assembly.

SUMMARY OF THE INVENTION

The multiple fuel rod gripper comprises a plurality of split tube collets arranged to be inserted into corresponding tapered holes in a locking plate. When the gripper has been positioned to have a plurality of fuel rods disposed in the holes of locking plate, an actuating mechanism causes the collets to be inserted into the tapered holes thereby causing the fuel rods to be inserted in the collets. The taper of the holes forces the collets into locking engagement with the fuel rods so that the fuel rods may be extracted from the fuel assembly.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In the consolidation of spent fuel rods it is important to be able to simultaneously remove a plurality of spent fuel rods from the spent fuel assembly. The invention disclosed herein provides apparatus for so removing the fuel rods.

Figure 1:
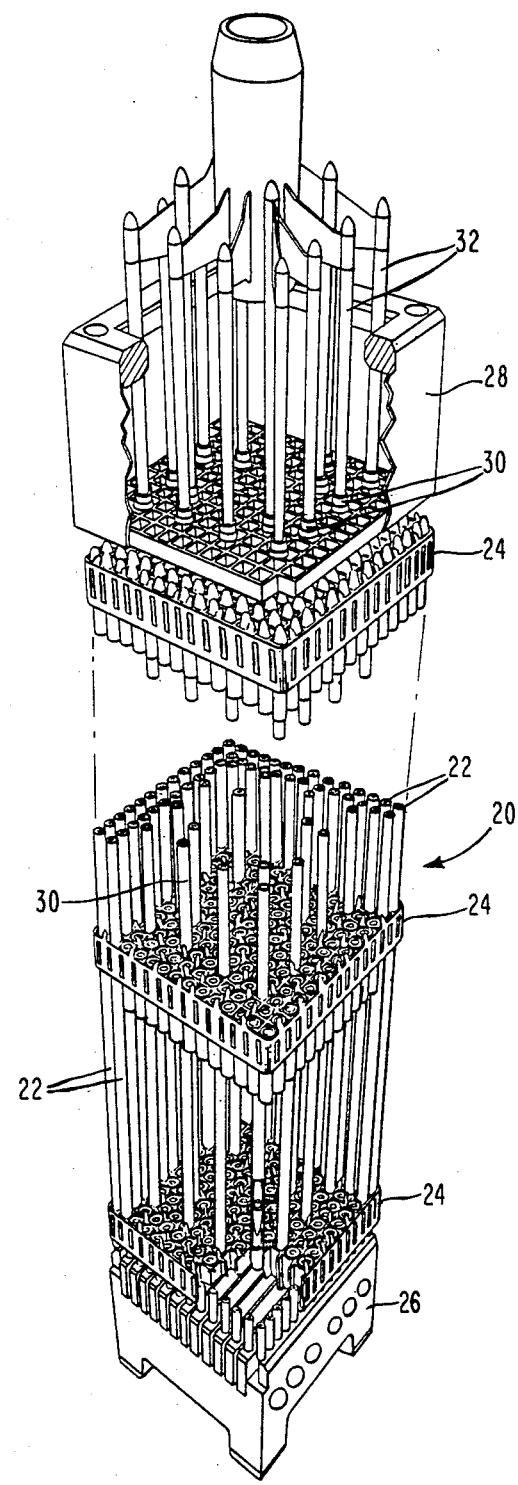
FIG. 1 is a view in perspective of a fuel assembly and control rod mechanism.

Referring to FIG. 1, a fuel assembly is referred to generally as 20 and may comprise fuel rods 22, grids 24, bottom nozzle 26, top nozzle 28 and guide tubes 30. Fuel rods 22 may be elongated cylindrical metallic tubes containing nuclear fuel pellets and having both ends sealed by end plugs. Fuel rods 22 may be arranged in a substantially rectangular array and may be slidably held in position by grids 24. Grids 24 are positioned at various locations along the length of fuel assembly 20 and serve to space fuel rods 22 and guide tubes 30 at appropriate distances from each other and to allow the reactor coolant to circulate in heat transfer relationship with fuel rods 22. Guide tubes 30 are disposed in fuel assembly 20 and may be hollow cylindrical metallic tubes capable of accommodating the insertion of control rods 32. Guide tubes 30 may be welded to top nozzle 28, grids 24, and bottom nozzle 26 to provide support to fuel assembly 20.

Figure 2:
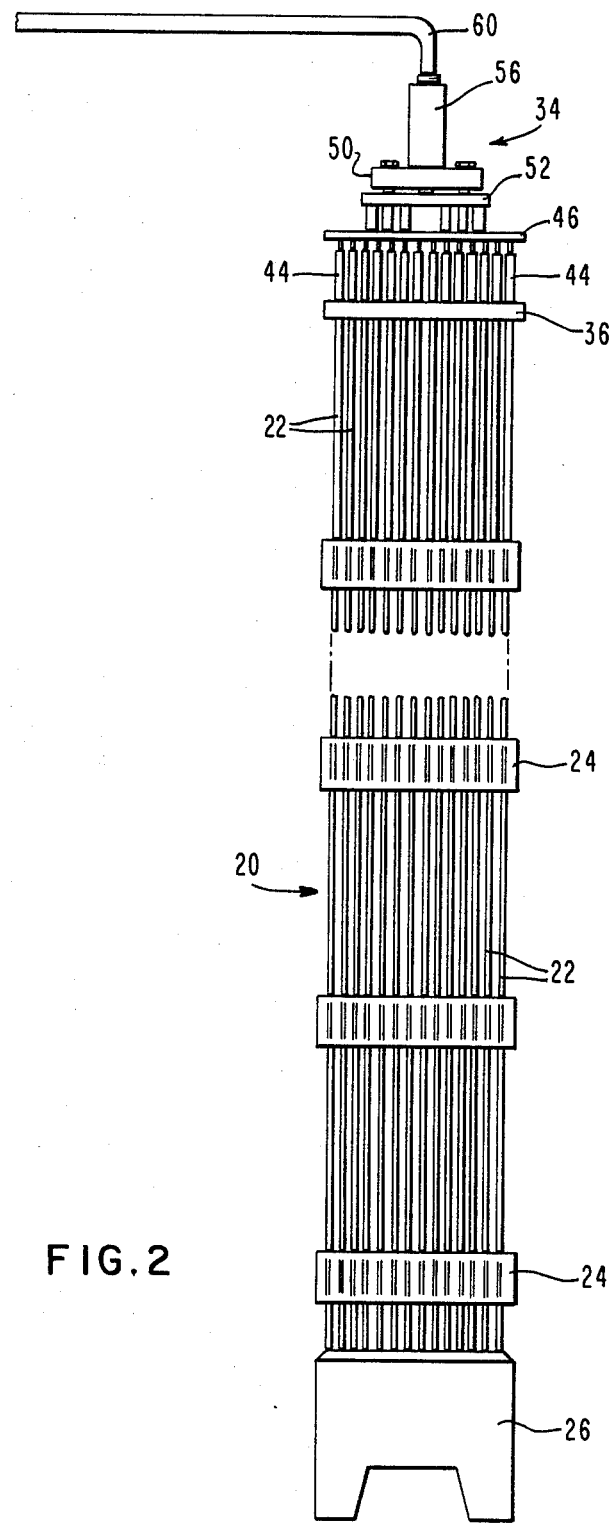
FIG. 2 is a view in elevation of a fuel assembly and gripper apparatus.

Referring now to FIG. 2, when it is desired to remove fuel rods 22 from fuel assembly 20, top nozzle 28 can be removed from fuel assembly 20 by various means such as internally cutting guide tubes 30. Once top nozzle 28 has been removed, a multiple fuel rod gripper referred to generally as 34 may be positioned on fuel assembly 20.

Figure 3:
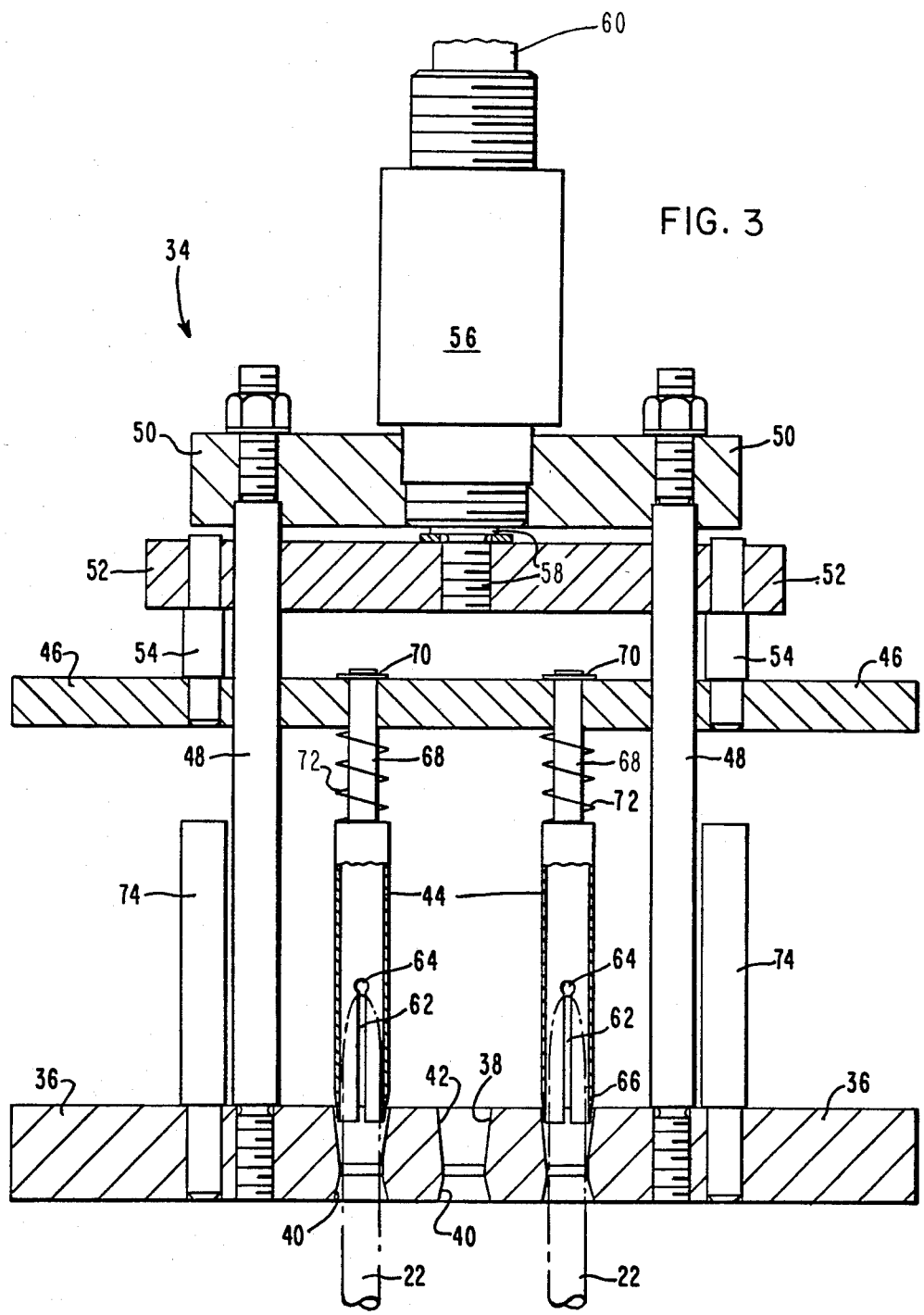
FIG. 3 is a partial cross-sectional view in elevation of the gripper apparatus in the unlocked position.
Figure 4:
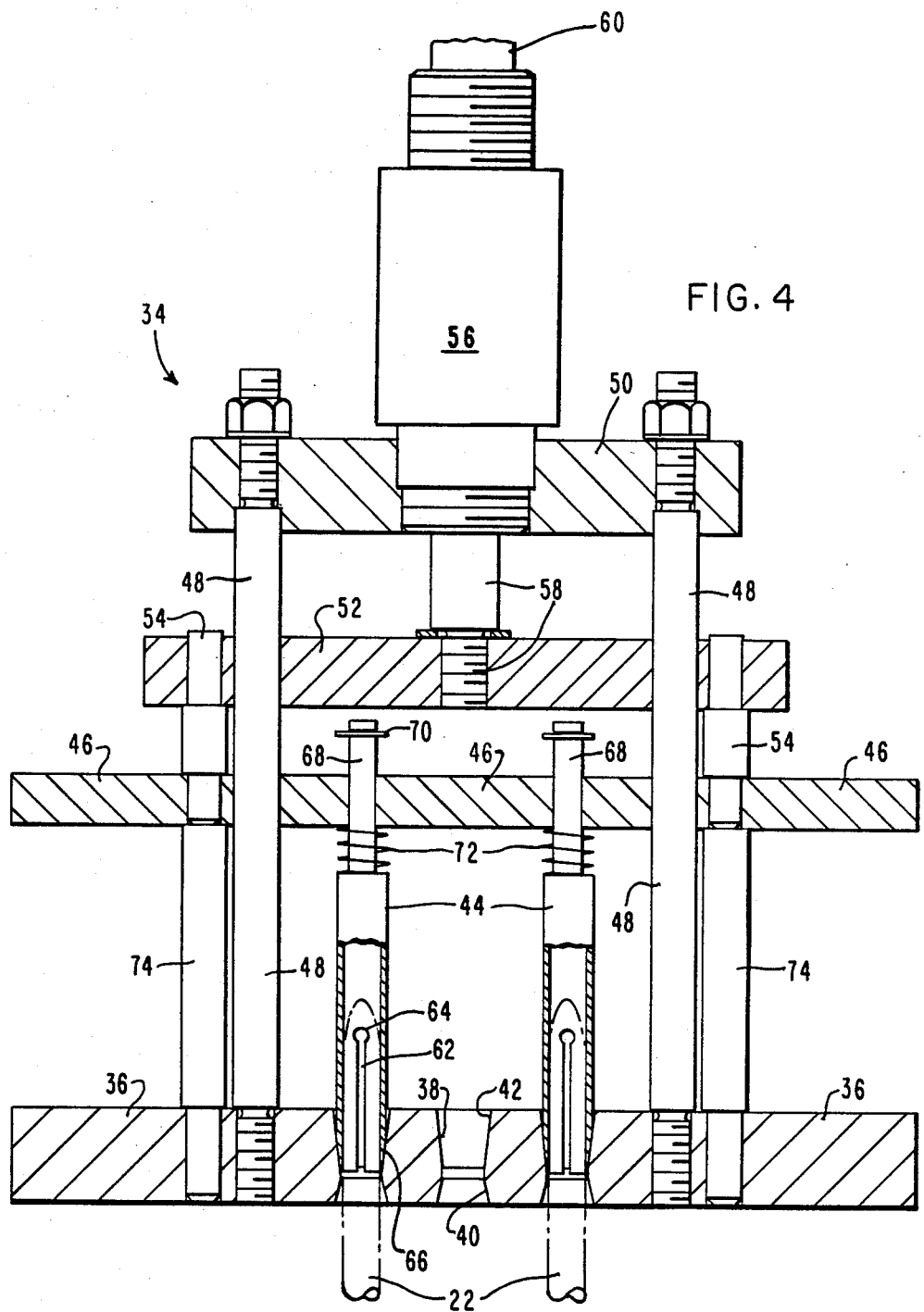
FIG. 4 is a partial cross-sectional view in elevation of the gripper apparatus in the locked position.

Referring to FIGS. 2-4, gripper 34 may be comprise a locking plate 36 having a plurality of tapered holes 38 therein for accommodating the insertion of fuel rods 22. Tapered holes 38 are arranged to correspond to the number of fuel rods 22 that are to be removed from fuel assembly 20. Each tapered hole 38 has a first taper 40 on one side for receiving fuel rods 22 and a second taper 42 on the other side for receiving collets 44. First taper 40 is designed to allow a variety of sizes of fuel rods 22 to easily enter tapered hole 38 and to be centered therein while second taper 42 is designed with an angle of approximately 6° to allow the insertion of collets 44 therein and over fuel rods 22. Second taper 42 also provides a self-locking function that prevents the inadvertent withdrawal of collets 44 by holding fuel rods 22 therein except when collets 44 are withdrawn.

Gripper 34 may also comprise a top plate 46 through which a plurality of attachment rods 48 are slidably disposed. Attachment rods 48 are attached at one end to locking plate 36 and at the other end to support plate 50. Attachment rods 48 are also slidably disposed through actuator plate 52 which is connected to top plate 46 by means of pins 54. An actuating means 56 which may be a double acting hydraulic cylinder is attached to support plate 50 and has a piston 58 extending through support plate 50 and attached to actuator plate 52. Actuating means 56 may also be attached to support arm 60 for supporting gripper 34 in relation to a fuel assembly 20. Actuating means 56 provides a mechanism for selectively moving piston 58 and actuator plate 52 relative to locking plate 36. Since actuator plate 52 is connected to top plate 46 by pins 54 and since actuator plate 52 and top plate 46 are slidably disposed on attachment rods 48, the movement of piston 58 results in movement of top plate 46 and actuator plate 52 relative to support plate 50 and locking plate 36 as shown in FIGS. 3 and 4.

Each collet 44 may be a substantially hollow cylindrical metallic member having an open end arranged to be disposed over a fuel rod 22 and capable of being inserted into tapered holes 38. Collets 44 may be made of 17-4PH stainless steel and have at least two longitudinal slots 62 therein. Each longitudinal slot 62 extends from the open end of collet 44 to approximately half-way along its length and may terminate in a substantially circular opening 64. Collets 44 also have a tapered leading edge 66 at its open end for facilitating insertion into tapered holes 38. Longitudinal slots 62 provide sufficient resiliency to collets 44 to enable collets 44 to be inserted into tapered holes 38 and over fuel rods 22 in a manner to grip fuel rods 22 which may have differing cross-sectional widths. The flexibility and resiliency of collets 44 allow fuel rods 22 to be firmly grasped by collets 44 for removal from fuel assemblies 20 without damaging fuel rods 22. Circular openings 64 also enhance the resiliency of collets 44 without creating a stress concentration.

Each collet 44 has a metal shaft 68 either attached to its closed end or integral therewith with each shaft 68 being slidably disposed through top plate 46. Each shaft 68 also has a retaining device 70 such as a nut or retaining ring attached to the end thereof on the top side of top plate 46 for preventing shaft 68 from being dislodged from top plate 46. Each shaft 68 has a biasing means 72 which may be a coil spring disposed around shaft 68 between collet 44 and top plate 46 for urging collet 44 away from top plate 46. Shafts 68 and associated collets 44 are arranged to correspond to the number and location of tapered holes 38 which correspond to the number of fuel rods 22 to be removed from fuel assembly 20.

Gripper 34 also comprises a plurality of cylindrical stops 74 attached at one end to locking plate 36 and arranged to contact top plate 46 for limiting the travel of top plate 46 relative to locking plate 36. Stops 74 may be arranged perpendicular to locking plate 36 and top plate 46 and parallel to attachment rods 48.

OPERATION

When it is desired to remove fuel rods 22 from a fuel assembly 20 such as in a spent fuel consolidation program similar to the one described in copending patent application Ser. No. 268,225, filed May 29, 1981 in the name of P. Pomaibo et al. entitled "Spent Fuel Consolidation System" which is assigned to the Westinghouse Electric Corporation, fuel assembly 20 is positioned on a locking device for firmly holding bottom nozzle 26. Top nozzle 28 is then removed and gripper 34 may be positioned over fuel assembly 20 by support arm 60, as shown in FIG. 2. Gripper 34 may then be lowered onto fuel assembly 20 so that all the fuel rods to be removed are disposed in tapered holes 38 of locking plate 36. When in this position, as shown in FIG. 3, collets 44 are disposed over fuel rods 22 but not in a locked configuration. Then, actuating means 56 is activated which causes piston 58 to be extended. The extension of piston 58 causes actuator plate 52 and top plate 46 to slide along attachment rods 48 toward locking plate 36 until top plate 46 contacts stops 74, as shown in FIG. 4. As top plate 46 is moed toward locking plate 36, biasing means 72 are compressed while shafts 68 extend through top plate 46. The compression of biasing means 72 causes collets 44 to be further inserted into tapered holes 38. As collets 44 are inserted into tapered holes 38, edges 66 contact second taper 42 which forces collet 44 to tightly grip fuel rod 22. Due to the flexibility of collet 44 and due to second taper 42, collet 44 is capable of gripping a variety of fuel rods 22 that may have various crosssectional widths. The ability of shafts 68 to independently slide relative to top plate 46 while collets 44 are inserted in tapered holes 38, also enhances the ability of collets 44 to grip various sizes of fuel rods 22 because collets 44 will grip a certain size fuel rod 22 at a particular depth in tapered hole 38. Since shafts 68 may slide independently of each other relative to top plate 46, each collet 44 is only inserted into the corresponding tapered hole 38 to a sufficient depth for engaging the particular fuel rod disposed therein. Thus, gripper 34 is capable of extracting a plurality of fuel rods each having the same or different sizes.

With collets 44 gripping fuel rods 22, support arm 60 can be activated to lift gripper 34 and fuel rods 22 gripped thereby relative to fuel assembly 20. In this manner, a plurality of fuel rods 22 can be simultaneously extracted from a fuel assembly. It should be noted that due to the resiliency of collects 44 and the shape of second taper 42, fuel rods 22 will not fall from collets 44 even if the power to actuating means 56 is interrupted. Rather, in order to release fuel rods 22 from collets 44 actuating means 56 must be activated to retract piston 58 thereby pulling collets 44 from tapered holes 38.

Therefore, it can be seen that the invention provides apparatus for efficiently removing spent fuel rods from a spent fuel assembly.

I claim:

1. A multiple fuel rod gripper for extracting nuclear fuel rods from a nuclear fuel assembly comprising:
    a locking plate having a plurality of tapered holes therein corresponding to the arrangement of fuel rods to be extracted from a fuel assembly;
    a plurality of attachment rods connected to said locking plate;
    a support plate connected to said attachment rods;
    a top plate slidably disposed on said attachment rods between said support plate and said locking plate;
    a plurality of shafts independently slidably disposed through said top plate;
    a plurality of metallic flexible substantially cylindrical hollow collets having a closed end attached to one of said shafts and having an open end for accepting and gripping one of said fuel rods in said tapered holes;
    a biasing means disposed around each of said shafts and between said collets and said top plate for urging said collets toward said locking plate; and
    actuating means disposed on said support plate and connected to said top plate for selectively moving said top plate relative to said attachment rods thereby forcing said collets into said tapered holes for gripping said fuel rods.

2. The gripper according to claim 1 wherein said collets have a longitudinal slot therein extending from said open end to near midway along its length.

3. The gripper according to claim 2 wherein said biasing means is a coil spring disposed around said shaft.

4. The gripper according to claim 3 wherein said gripper further comprises a plurality of cylindrical stops mounted on said locking plate between said locking plate and said top plate for limiting the travel of said top plate.

5. The gripper according to claim 4 wherein said collets have a tapered edge near said open end for facilitating insertion into said locking plate.

6. The gripper according to claim 5 wherein said tapered holes comprise:

a first taper on one side of said locking plate for facilitating the insertion of said fuel rods; and a second taper on the other side of said locking plate for facilitating the insertion of said collets.

7. The gripper according to claim 6 wherein said second taper has an angle of approximately 6°.

8. The gripper according to claim 7 wherein said collets have a circular opening therein at the end of said slot.

9. The gripper according to claim 8 wherein said gripper further comprises an actuator plate slideably disposed on said attachment rods between said support plate and said top plate and connected to said top plate.

10. The gripper according to claim 9 wherein said actuating means comprises a double acting hydraulic cylinder mounted on said support plate and having a piston extending through said support plate and connected to said actuator plate.

11. The gripper according to claim 10 wherein said gripper further comprises a retaining device attached to each of said shafts for holding said shafts on said top plate.

* * * * *